(12) United States Patent
Okoshi et al.

(10) Patent No.: US 11,467,752 B2
(45) Date of Patent: Oct. 11, 2022

(54) DATA MIGRATION SYSTEM AND DATA MIGRATION METHOD

(71) Applicant: Hitachi, Ltd., Tokyo (JP)

(72) Inventors: Jumpei Okoshi, Tokyo (JP); Tsunehiko Baba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/166,520

(22) Filed: Feb. 3, 2021

(65) Prior Publication Data
US 2022/0035553 A1    Feb. 3, 2022

(30) Foreign Application Priority Data
Jul. 28, 2020    (JP) .............................. JP2020-127235

(51) Int. Cl.
*G06F 3/06*        (2006.01)
*G06F 16/28*       (2019.01)

(52) U.S. Cl.
CPC .......... *G06F 3/0647* (2013.01); *G06F 3/0604* (2013.01); *G06F 3/067* (2013.01); *G06F 3/0661* (2013.01); *G06F 16/284* (2019.01)

(58) Field of Classification Search
CPC .... G06F 3/0647; G06F 3/0604; G06F 3/0661; G06F 3/067; G06F 16/284
See application file for complete search history.

(56) References Cited

U.S. PATENT DOCUMENTS

| | | | | |
|---|---|---|---|---|
| 8,037,108 | B1* | 10/2011 | Chang | G06F 16/214 707/803 |
| 10,803,031 | B1* | 10/2020 | Wilton | G06F 16/214 |
| 2001/0047367 | A1* | 11/2001 | Eda | G06F 16/289 |
| 2003/0195862 | A1* | 10/2003 | Harrell, Jr. | G06F 16/252 |
| 2004/0122865 | A1* | 6/2004 | Stahl | G06F 16/214 |
| 2005/0097086 | A1* | 5/2005 | Merchant | G06F 16/214 |
| 2006/0173865 | A1* | 8/2006 | Fong | G06F 40/151 |
| 2006/0195436 | A1* | 8/2006 | Levesque | G06F 8/71 |
| 2008/0320054 | A1* | 12/2008 | Howard | G06F 8/51 |
| 2010/0094838 | A1* | 4/2010 | Kozak | G06F 16/2443 707/705 |
| 2013/0246479 | A1* | 9/2013 | Kumano | G06F 16/20 707/792 |
| 2014/0208290 | A1* | 7/2014 | McGillin | G06F 8/51 717/106 |
| 2016/0188710 | A1* | 6/2016 | Dulba Naik | G06F 16/214 707/792 |

(Continued)

FOREIGN PATENT DOCUMENTS

JP      2011-197988 A    10/2011

*Primary Examiner* — Ryan Bertram
(74) *Attorney, Agent, or Firm* — Baker Botts L.L.P.

(57) ABSTRACT

When performing a data migration of a first data store management system to a second data store management system, a data migration system receives a data migration rule, based on a data migration rule, converts a first data into a second data, acquires a first data model as a data model of the first data, acquires a second data model as a data model of the second data, and acquires a second program. Then, a data model conversion rule that causes the first data model to correspond to the second data model is generated based on the data migration rule, the first data model, and the second data model, and the second program is converted into a first program based on the data model conversion rule.

9 Claims, 18 Drawing Sheets

(56) References Cited

U.S. PATENT DOCUMENTS

2020/0034342 A1* 1/2020 Mohapatra .............. G06F 16/21
2020/0218717 A1* 7/2020 Sharma ............... G06F 16/2425
2020/0394164 A1* 12/2020 Apte ................. G06F 16/24532

* cited by examiner

FIG. 8

DATA MIGRATION RULE DTMR

|  | Source | Target |
|---|---|---|
| IP | 192.168.1.1 | 192.168.1.2 |
| PORT | 1923 | 5432 |
| USER | user1 | user2 |
| PASSWORD | password1 | password2 |
| DATABASE | RDB1 | DOC2 |
| RULE 1 | T1 | T2 |
| RULE 2 | Column.ID | Field.ID |
| RULE 3 | Column.VAR | Field.VAR |

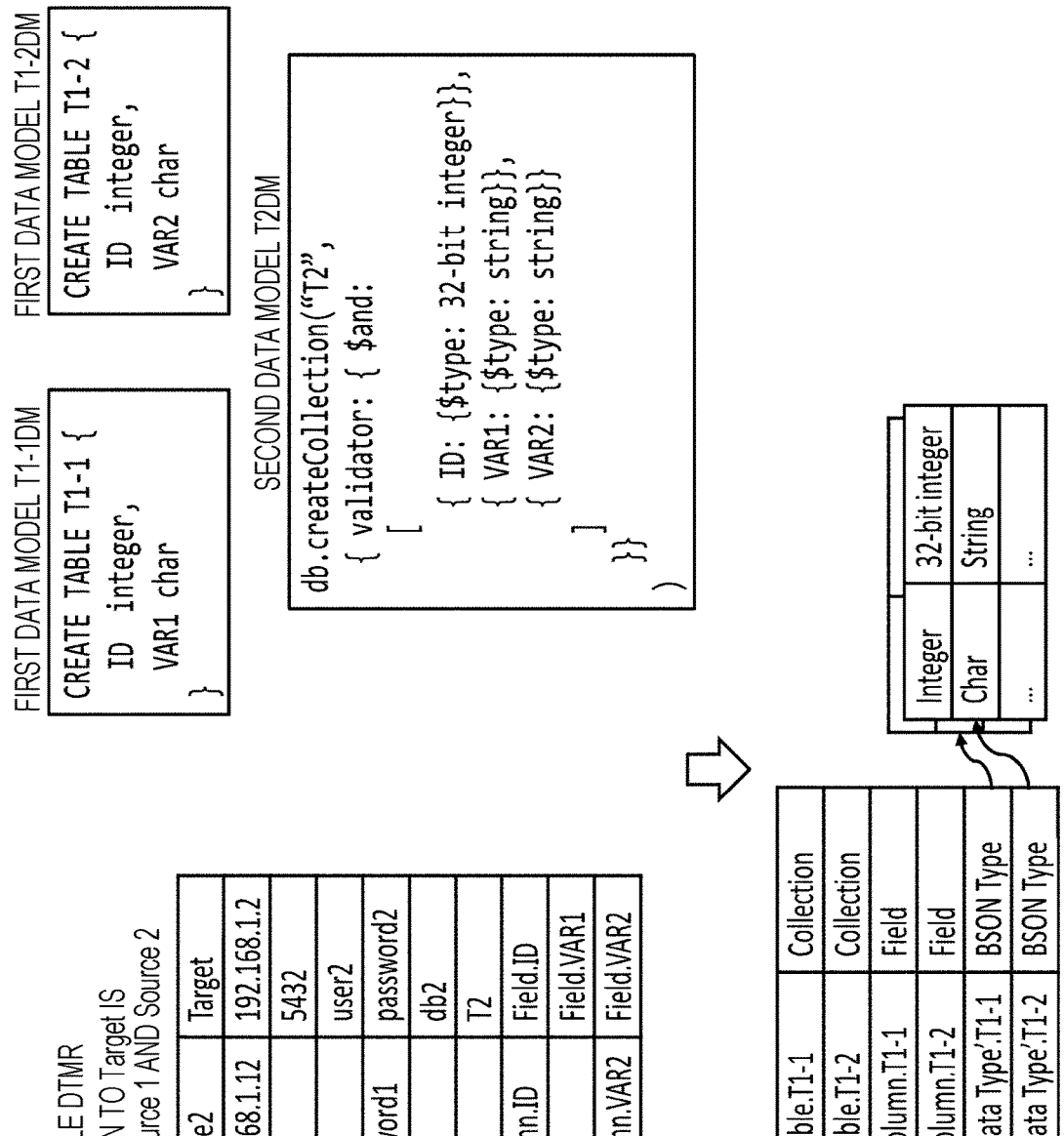

DATA MIGRATION SYSTEM AND DATA MIGRATION METHOD

BACKGROUND OF THE INVENTION

1. Field of the Invention

The present invention relates to a data migration system and a data migration method, and more particularly to a data migration system and a data migration method suitable for performing a program migration between data stores having different kinds of data models without spending man-hours.

2. Description of the Related Art

With a globalization of a network seen on the Internet and the like in recent years, a form of an information processing system in a company and the like is transiting from on-premises environments to a cloud. With such a change in a development paradigm, needs for a data migration for various data stores are increasing.

Here, a data store means a function or an entity that permanently stores and accumulates data in a storage device in a determined format in a configuration of an information processing system, and a relational database (RDBMS), a key-value store (KVS), a cloud storage, or the like is one example of its actual implementation.

On the other hand, in software development, in general, before running a program in a production environment, verification and testing are performed in a proof of concept (PoC) environment to improve a quality of a software, and the passed program is run in a production environment.

For example, JP 2011-197988 A discloses a software migration. JP 2011-197988 A discloses a database conversion system that converts an application that accesses a hierarchical database into an application that accesses a relational database while retaining a logic of the application on a general-purpose device.

SUMMARY OF THE INVENTION

In the database conversion system disclosed in JP 2011-197988 A, a query conversion program specifies a query for accessing a relational database obtained by converting the hierarchical database based on structure definition data of the hierarchical database and an access parameter when a COBOL program accesses the hierarchical database. Then, among SQL components that are prepared in advance and access the relational database, a SQL component that corresponds to the query is selected, and the access parameter is transferred to execute the query.

As described above, JP 2011-197988 A discloses a system that supports a migration of an application software between database systems using different kind of data models, that is, the hierarchical database and the relational database.

However, the model that can be applied to each of the database systems is limited to the hierarchical database or the relational database, and does not have versatility that can be applied to various data models.

An object of the present invention is to provide a data migration system capable of reducing man-hours of program migration and promptly performing the migration between data stores based on various data models.

According to an aspect of the present invention, there is provided a data migration system that performs a data migration of a first data store management system to a second data store management system. The first data store management system executes a first program inputting and outputting a first data; a second data store management system executes a second program inputting and outputting a second data and receives a data migration rule, based on the data migration rule, converts the first data into the second data, acquires a first data model as a data model of the first data, acquires a second data model as a data model of the second data, and acquires a second program. A data model conversion rule that causes the first data model to correspond to the second data model is generated based on the data migration rule, the first data model, and the second data model, and the second program is converted into the first program based on the data model conversion rule.

According to the present invention, a data migration system capable of reducing man-hours of program migration and promptly performing the migration between data stores based on various data models can be provided.

BRIEF DESCRIPTION OF THE DRAWINGS

FIG. 8 is a diagram illustrating an example of a data migration rule;

FIG. 18 is a diagram illustrating a relationship among a data migration rule, a data model conversion rule, and a data model according to Embodiment 2.

DESCRIPTION OF THE PREFERRED EMBODIMENTS

Hereinafter, each embodiment of the present invention will be described with reference to FIGS. 1 to 18.

Embodiment 1

Hereinafter, Embodiment 1 of the present invention will be described with reference to FIGS. 1 to 15.

In the embodiment, assuming that a program based on an RDB is executed in a production environment, an example in which in a PoC environment (a demonstration environment), a program, which inputs data based on a document type database and outputs data based on RDB data, is developed, and the program is migrated so as to be used in the production environment will be described. The embodiment may be applied to a system to which other data models are applied, for example, a data model of a key value or a data model of a file system.

Figure 1:
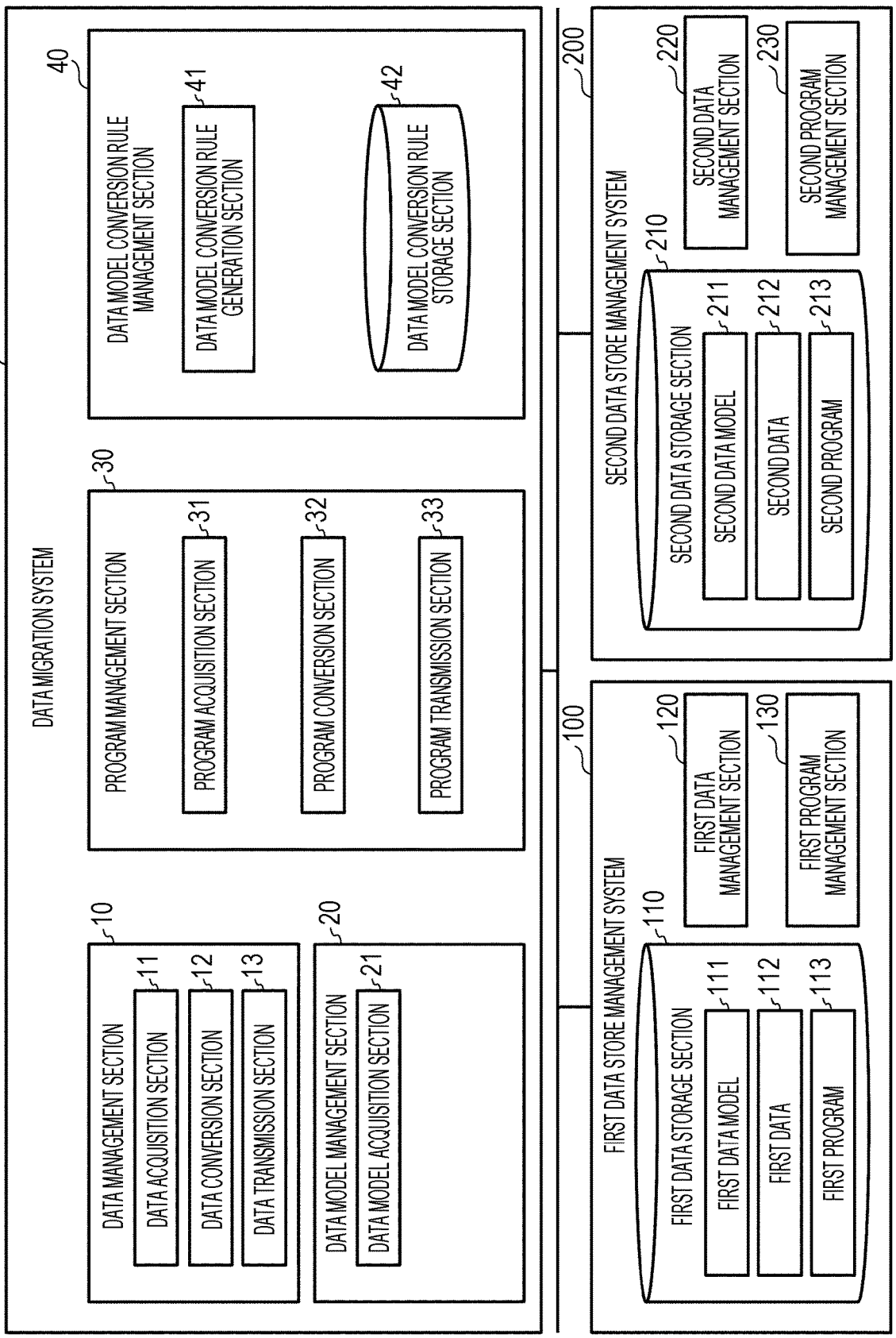
FIG. 1 is a diagram illustrating a configuration of an information processing system in which a data migration system is used according to Embodiment 1.

An information processing system illustrated in Embodiment 1 is configured of a first data store management system 100, a second data store management system 200, and a data migration system 1 that supports a data migration between the first data store management system 100 and the second data store management system 200, and a migration of a program related to the data migration as illustrated in FIG. 1.

Here, the first data store management system is a system in a production environment, and the second data store management system is a system in a PoC environment.

A data migration system 1 is a system that supports a data migration between the first data store management system 100 and the second data store management system 200, and a migration of a program related to the data migration. The data migration system 1 includes a data management section 10, a data model management section 20, a program management section 30, and a data model conversion rule management section 40.

The data management section 10 is a functional section that manages data for the data migration between the first data store management system 100 and the second data store management system 200. The data management section 10 includes a data acquisition section 11, a data conversion section 12, and a data transmission section 13.

The data acquisition section 11 is a functional section that acquires data from the first data store management system 100. The data conversion section 12 is a functional section that converts data of the first data store management system 100 into data of the second data store management system 200. The data transmission section 13 is a functional section that transmits data converted by the data migration system 1 to the second data store management system 200.

The data model management section 20 is a functional section that manages a data model handled in the data migration system 1. The data model management section 20 includes a data model acquisition section 21.

The data model acquisition section 21 is a functional section that acquires a data model from the first data store management system 100, and the second data store management system 200.

The program management section 30 is a functional section that manages a program executed by the first data store management system, and the second data store management system. The program management section 30 includes a program acquisition section 31, a program conversion section 32, and a program transmission section 33.

The program acquisition section 31 is a functional section that acquires a program executed by the second data store management system. The program conversion section 32 is a functional section that converts the program executed by the second data store management system into a program to be acquired with the first data store management system. The program transmission section 33 is a functional section that transmits the generated program to the first data store management system.

The data model conversion rule management section 40 is a functional section that manages a data model conversion rule used when the program executed by the second data store management system is converted into a program to be acquired with the first data store management system. The data model conversion rule management section 40 includes a data model conversion rule generation section 41, and a data model conversion rule storage section 42.

The data model conversion rule generation section 41 is a functional section that generates a data model conversion rule indicating a correspondence of the first data model and the second data model according to the input data migration rule. The data model conversion rule storage section 42 is a functional section that stores the data model conversion rule generated by the data model conversion rule generation section 41.

A first data store management system 100 is a system intended to be operated in the production environment, and includes a first data storage section 110, a first data management section 120, and a first program management section 130.

A first data model 111, a first data 112, and a first program 113 are stored in the first data storage section 110. The first data model 111 is a model that describes data handled by the first data store management system 100. In the embodiment, a query that describes an RDB will be described as an example. The first data 112 is data handled by the first data store management system 100. In the embodiment, the RDB table will be described as an example. The first program 113 is a program which is operated in the first data system. In the embodiment, a program that inputs the RDB table and outputs the RDB table as an output will be described as an example. The first program 113 is a program generated based on the program executed by the second data store management system 200 described by a user.

The first data management section 120 is a functional section that manages the first data 112. The first program management section 130 is a functional section that manages the first program 113.

A second data store management system 200 is a system intended to be operated in the PoC environment, and includes a second data storage section 210, a second data management section 220, and a second program management section 230.

A second data model 211, a second data 222, and a second program 223 are stored in the second data storage section 210. The second data model 211 is a model that describes data handled by the second data store management system 200. In the embodiment, a query that describes the document type database, and a query that describes the RDB will be described as an example. The second data 222 is data handled by the second data store management system 200. In the embodiment, a document type database collection and the RDB table will be described as an example. The second program 223 is a program which is operated in a second data system. In the embodiment, a program that inputs the document type database collection and outputs the RDB table as an output will be described as an example. The second program 223 is a program executed by the second data store management system 200 described by a user.

The second data management section 220 is a functional section that manages the second data 222. The second program management section 230 is a functional section that manages the second program 223.

A function of each of the functional sections of the first data store management system 100, the second data store management system 200, and the data migration system 1 is implemented by an information processing device which is hardware executing a program executing the functional sections by using a processor such as a central processor unit (CPU).

Next, a hardware configuration of each component of the information processing system of the embodiment will be described with reference to FIG. 2.

Figure 2:
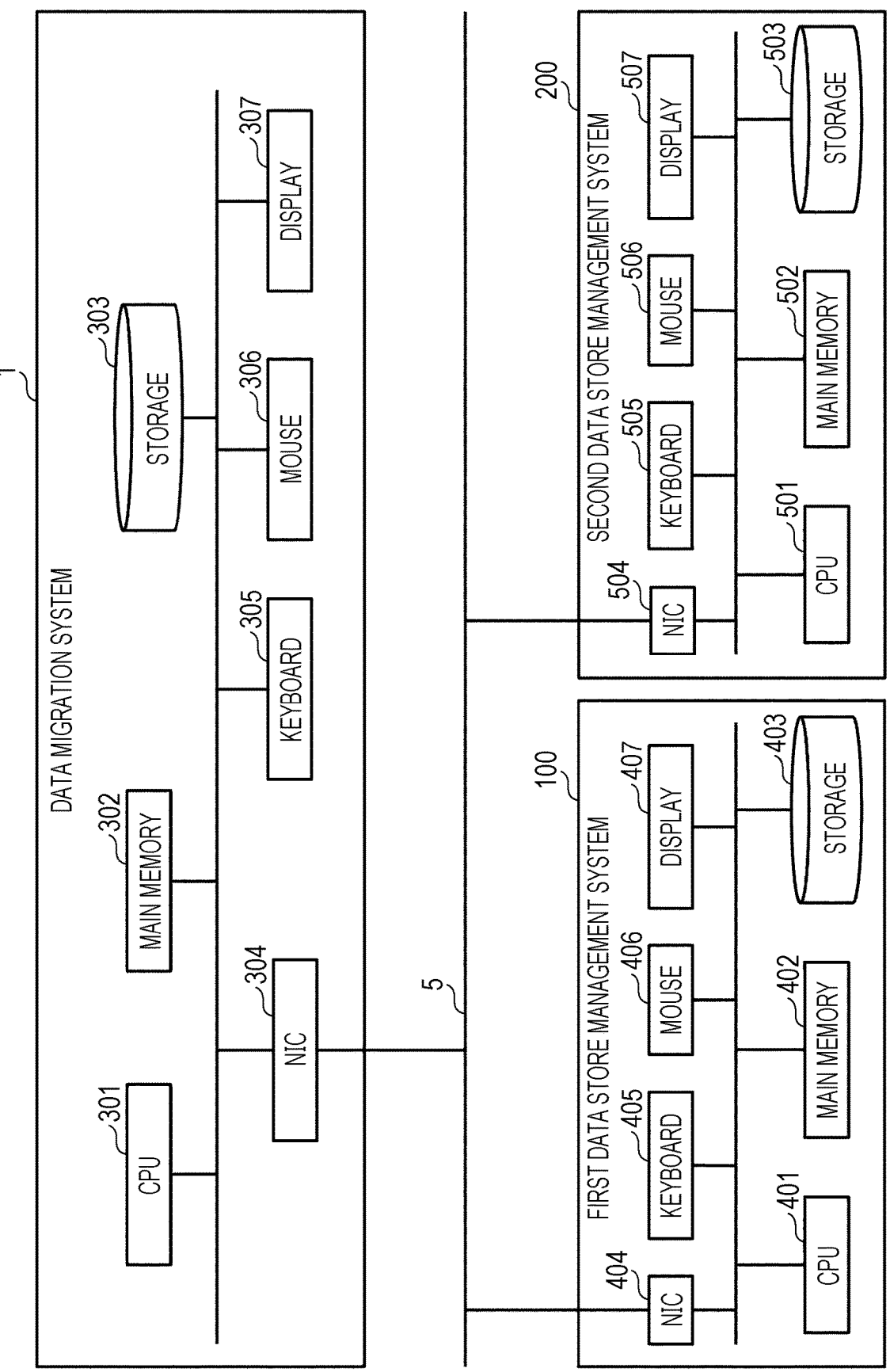
FIG. 2 is a diagram illustrating a configuration of hardware of an information processing system in which a data migration system is used according to Embodiment 1.

The hardware of each component of the information processing system of the embodiment can be realized by a general information processing device such as a server device, a personal computer, and a workstation illustrated in FIG. 2.

For example, as illustrated in FIG. 2, the data migration system 1 includes a CPU 301, a main memory 302, a storage 303, a network interface card (NIC) 304, a keyboard 305, a mouse 306, and a display 307, which are connected by a bus.

The CPU 301 controls each unit of the data migration system 1, loads and executes the necessary program in the main memory 302.

The main memory 302 is generally configured of a volatile memory such as a RAM, and stores a program executed by the CPU 301 and reference data.

The storage 303 is a large-capacity device that stores information of a hard disk drive (HDD), a solid state drive (SSD), or the like. A program for implementing the function of each functional section of the data migration system 1 is installed in the storage 303 of the embodiment.

An NIC 304 is an interface device for connecting to a network 5.

The keyboard 305 and the mouse 306 are interface devices for the user to input data and command.

The display 307 is a device that displays information of a liquid crystal display (LCD) or an organic EL display to the user.

The first data store management system 100 and the second data store management system 200 can also be realized by the same hardware configuration.

Next, an outline of the processing of performing a program migration by the information processing system of the embodiment will be described with reference to FIGS. 3 to 8.

First, an outline of the processing of performing the program migration by the information processing system of the embodiment will be described with reference to FIG. 3.

The information processing system of the embodiment is intended to perform a program migration developed in the second data store management system 200 to the first data store management system 100.

First, the first program will be described with reference to FIG. 4.

Figure 4:
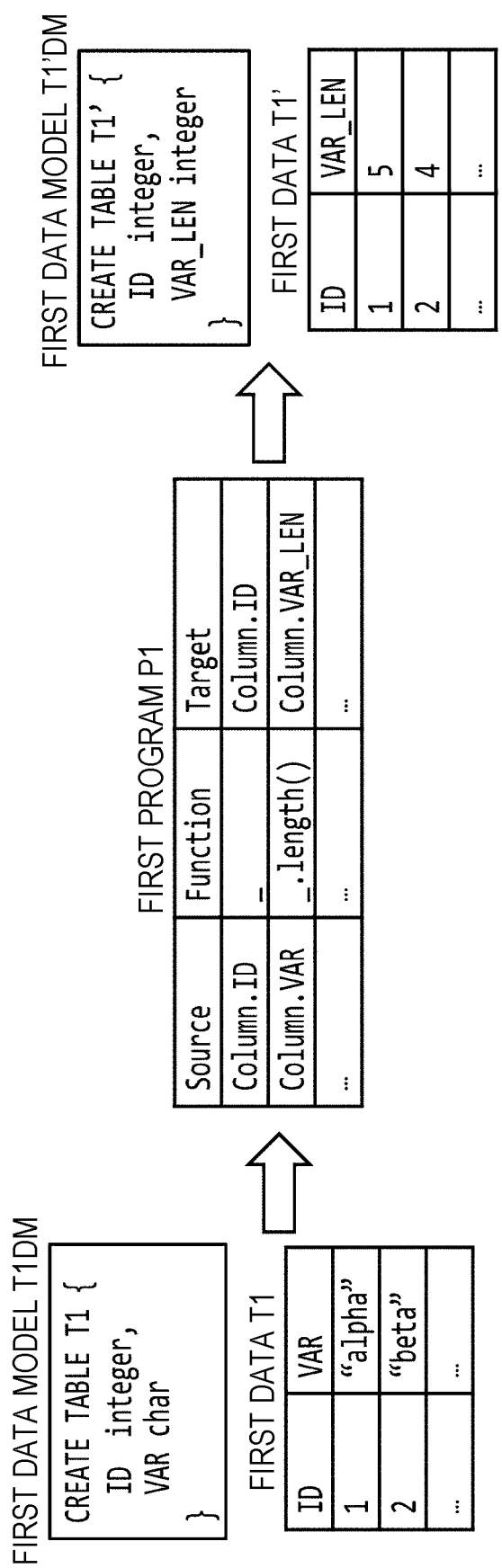
FIG. 4 is a diagram illustrating a first program.

As illustrated in FIG. 4, the first data model T1DM is defined by a query in the RDB (for example, "CREATE TABLE" that defines a table structure when the table is generated). As a first data T1, RDB TABLE ("ID" (integer type), and "VAR" (char type) as Column) is defined.

Here, as a specification of a first program P1, a length of a character string of the column of "ID" is output as a table T1'. That is, data model of the output data is represented by a first data model T1'DM.

In FIG. 4, the first program P1 is described in a table form in which an item in Source as an input, an item in Function as a function, and an item in Target as an output correspond to another in each row. The program may be described in a high-level language such as C, an assembler language, or the like as long as the input, the output, and the function are clear.

A first row of the first program P1 indicates that Column called ID of data of Source (a first data T1) is output (_) as it is to Column called ID of data of Target (a first data T1') as a function.

A second row of the first program P1 indicates that a length of Column called VAR of data of Source (the first data T1) is obtained (a function_length ( )), and then the length thereof is output to Column called VAR of data of Target (the first data T1').

Next, the second program will be described with reference to FIG. 5.

In the second data store management system, a query of the document type database and a query of the RDB are adopted as the data model.

Figure 5:
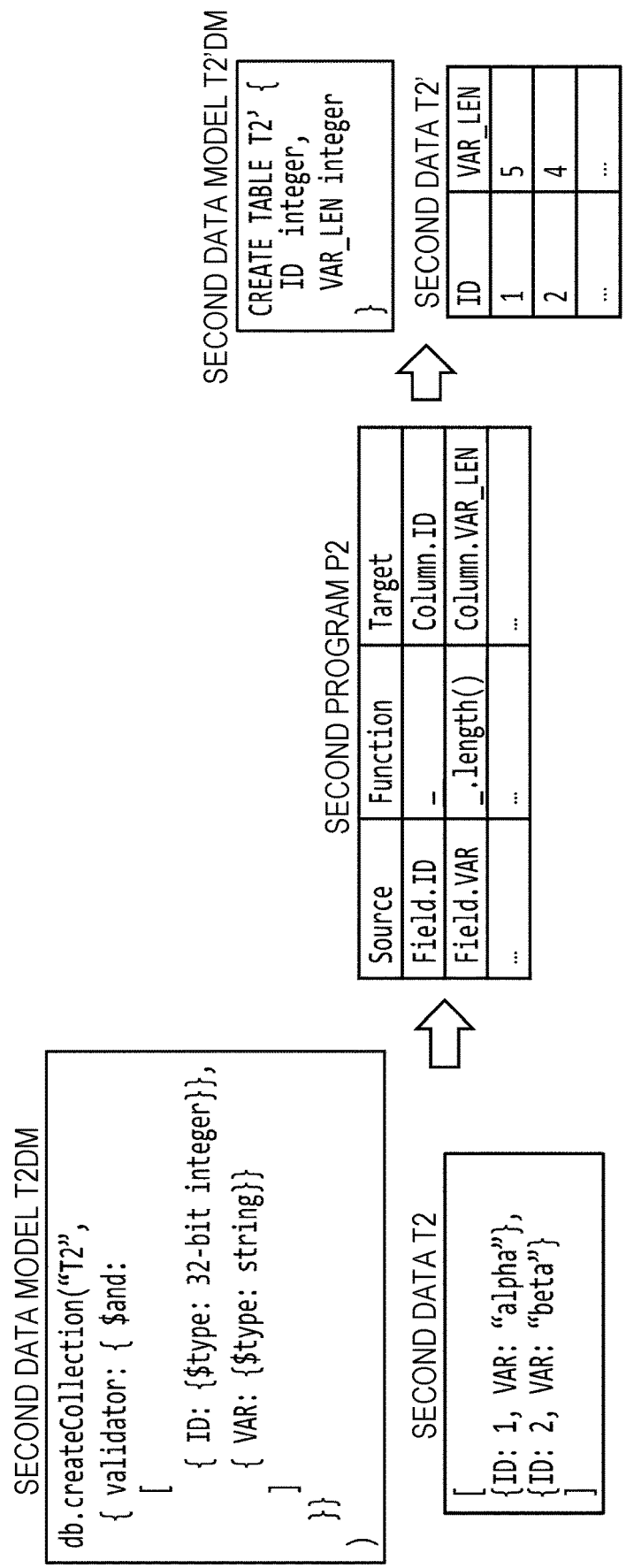
FIG. 5 is a diagram illustrating a second program.
Figure 6:
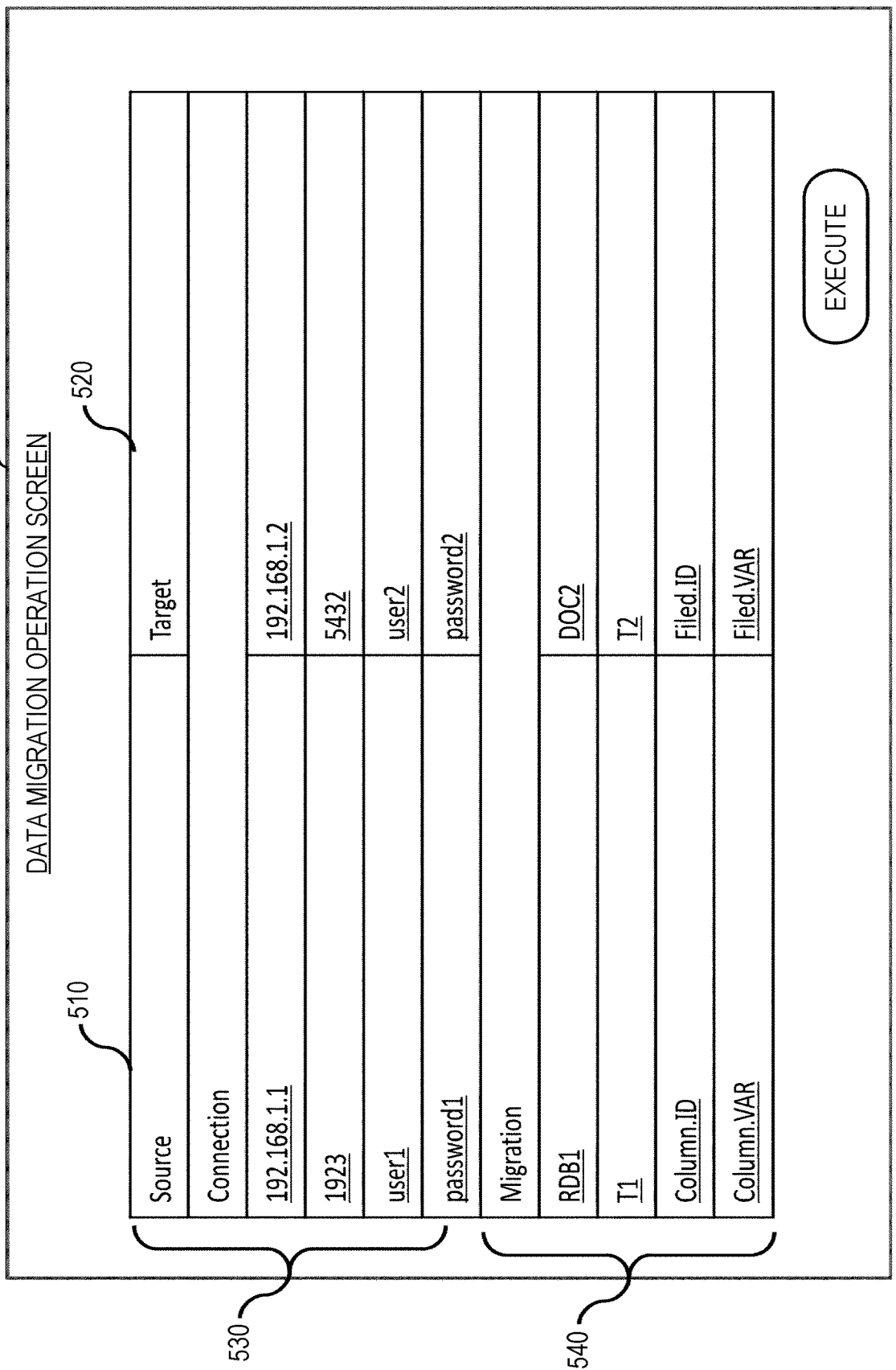
FIG. 6 is a diagram illustrating an example of a data migration operation screen.
Figure 7:
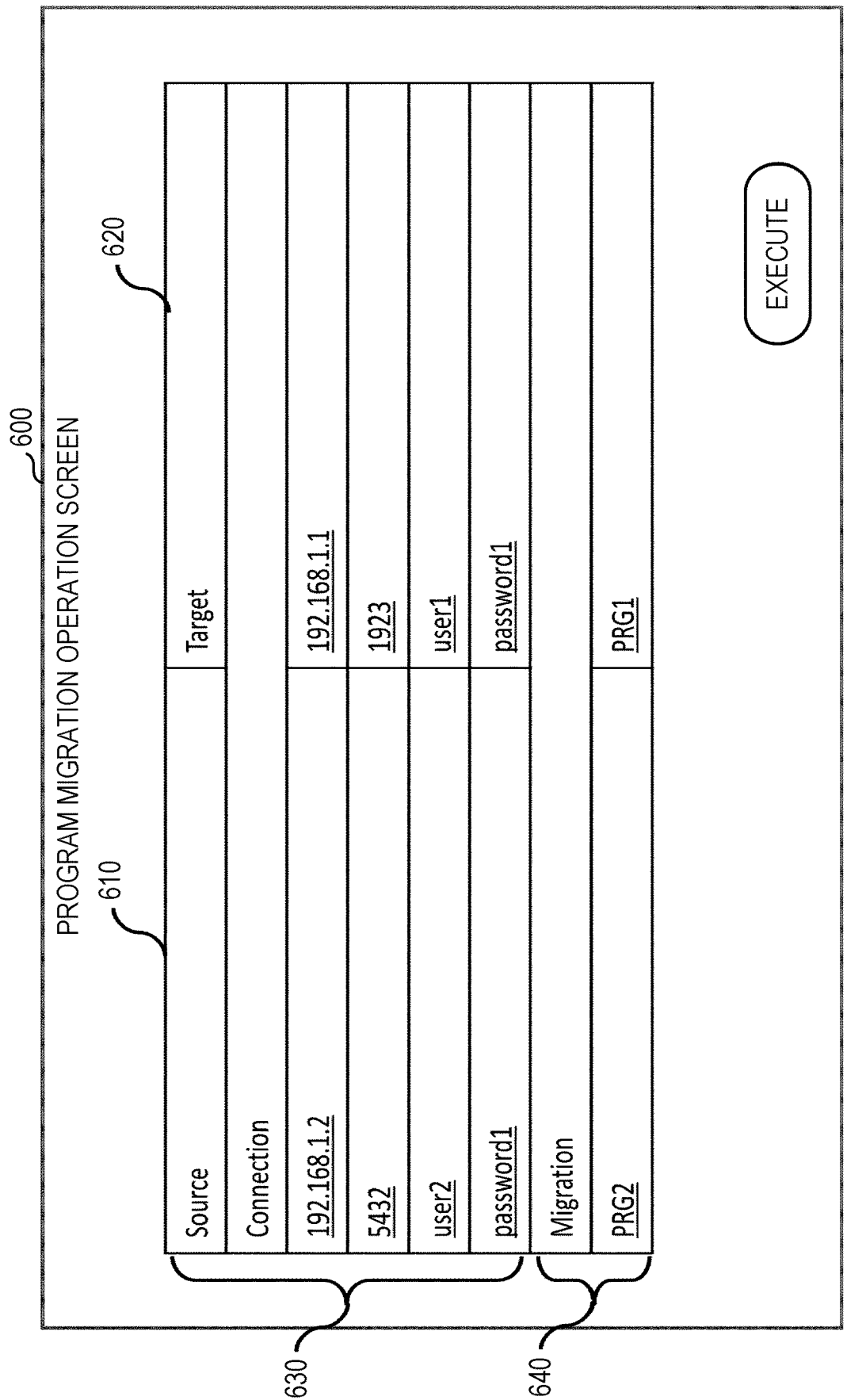
FIG. 7 is a diagram illustrating an example of a program migration operation screen.

As illustrated in FIG. 5, in a second table model T2DM, "ID" and "VAR" are defined as a field with respect to Collection "T2". Therefore, a second data T2 is Collection having "ID" and "VAR".

A second program P2 is a program equivalent (the same function as) to the first program P1, and the user (a system builder, a programmer, and the like) needs to describe the second program P2 and input the program to the data migration system 1.

A first row of the second program P2 indicates that Field called ID of data of Source (a second data T2) is output (_) as it is to Column called ID of data of Target (a second data T2') as a function.

A second row of the second program P2 indicates that a length of Field called VAR of data of Source (the second data T2) is obtained (a function_length ( )), and then the length thereof is output to Field called VAR LEN of data of Target (the second data T2').

A second data model T2'DM may be automatically generated and may be described by the user.

As an intention of the embodiment, since a migration of the second program P2 of the second data store management system to a program executed by the first data store management system is performed, the second data T2' is not used directly. However, the second data T2' can be used as verification data at the time of debugging the second program P2.

Hereinafter, a sequence diagram of FIG. 3 will be described in order.

First, the user inputs data migration rule information to the data migration system 1 (A00). For example, the data migration system 1 generates a data migration rule DTMR when the user inputs information on a data migration through the data migration operation screen 500 illustrated in FIG. 6.

In the data migration operation screen 500, a Source column 510 and a Target column 520 in the data migration are input in comparison with each other, connection information on a system related to Source and a system related to Target is input to a Connection row group 530, and a migration rule for data is input to a Migration row group 540. In the example illustrated in FIG. 6, migration information of an IP address, a port, a user ID, and a password in the system related to Source and the system related to Target is input to the Connection row group 530, and a correspondence of constituent elements (Column and Filled) such as a database name, a data name (Table and Collection) and data is indicated in the Migration row group 540.

When the generated data migration rule DTMR is expressed in a table form, the correspondence is made as illustrated in FIG. 8. In the table, first to fourth rows are information input to the Connection row group 530, and fifth to eighth rows are information input to the Migration row group 540.

Next, the data migration system 1 acquires the first data T1 from the first data store management system 100 (A01, and FIG. 4). In an initial state, the first data T1 and the first data model T1DM are stored in the first data store management system 100.

Next, the data migration system 1 converts the first data T1 into the second data T2 based on the data migration rule DTMR (S01). That is, the database name is converted from "RDB1" to "DOC2", TABLE T1 is converted to the DOCUMENT T2, and its Column and Field are also converted according to the rule.

Next, the data migration system 1 transmits the converted second data T2 to the second data store management system 200 (A02, and FIG. 5).

Next, the second data store management system 200 generates a second data model T2DM based on the received second data T2 (S02, and FIG. 5).

Next, the data migration system 1 acquires the first data model T1DM from the first data store management system 100 (A03, and FIG. 4).

Next, the data migration system 1 acquires the second data model T2DM from the second data store management system 200 (A04, and FIG. 5).

Next, the data migration system 1 generates a data model generation rule DMTR based on the acquired data migration rule DTMR, the first data model T1DM, and the second data model T2DM (S03).

The processing of generating the data model generation rule DMTR will be described in detail later.

Next, the user inputs program migration rule information to the data migration system 1 (A06). For example, the user inputs information on a program migration through a program migration operation screen 600 illustrated in FIG. 7.

In the program migration operation screen 600, a Source column 610 and a Target column 620 in the program migration are input in comparison with each other, connection information on a system related to Source and a system related to Target is input to a Connection row group 630, and a migration rule for a program is input to a Migration row group 640. In the example illustrated in FIG. 7, migration information of an IP address, a port, a user ID, and a password in the system related to Source and the system related to Target is input to the Connection row group 630, and a correspondence of program names is indicated in the Migration row group 640.

On the other hand, the user inputs the second program P2 to the second data store management system (A05). When verification such as program debugging is required, the second program P2 is executed in the second data store management system (S04, and FIG. 5).

Next, the data migration system 1 converts the acquired second program P2 into the first program P1 based on the data model conversion rule DMR generated in S03 (S05).

The processing of converting the first program P1 will be described in detail later.

Next, the data migration system 1 transmits the generated first program P1 to the first data store management system 100 (A08).

Finally, as a production environment, the first data store management system 100 executes the received first program P1 (S06).

Next, the details of the processing of the information processing system of the embodiment will be described with reference to FIGS. 9 to 16.

First, the processing until the data migration system generates the data model conversion rule will be described with reference to FIG. 9.

Figure 3:
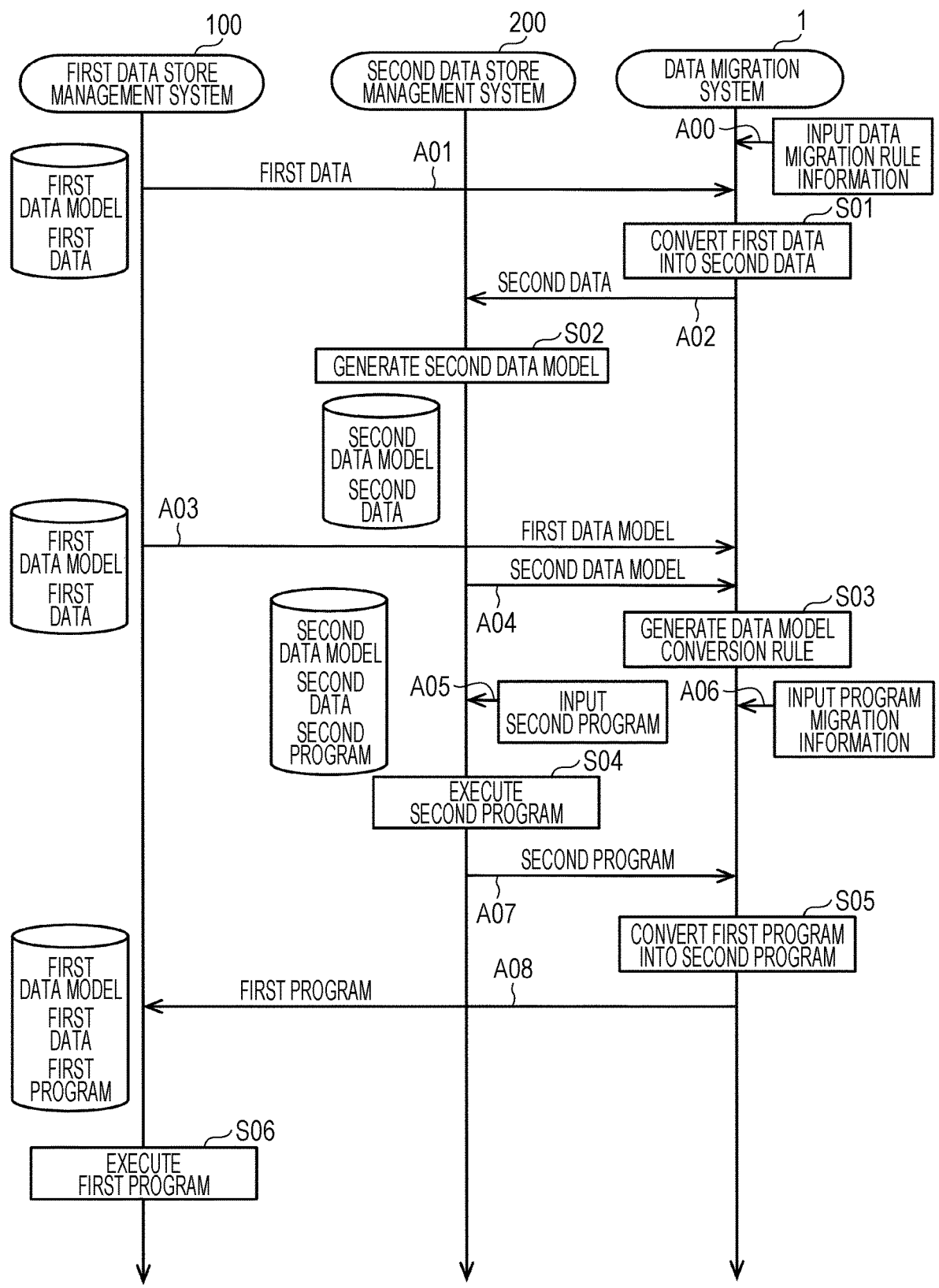
FIG. 3 is a sequence diagram illustrating an outline of processing of performing a data migration by an information processing system according to Embodiment 1.

First, the data migration system 1 acquires input of information on a data migration rule of the first data store management system 100 to the second data store management system 200 from the user (S100, and A00 in FIG. 3).

Next, the data migration system 1 acquires the first data from the first data store management system (S101, and A01).

Next, the data migration system 1 converts the first data T1 into the second data T2 (S01 in FIG. 3), and transmits the converted second data T2 to the second data store management system 200 (S102, and A02).

Next, the data migration system 1 acquires the first data model T1DM from the first data store management system 100 (A03), and acquires the second data model T2DM from the second data store management system 200 (A04) (S103).

Next, the data migration system 1 generates a data model conversion rule DMCR from the first data model T1DM, the second data model T2DM, and the data migration rule DTMR (S104, and S03).

Figure 11:
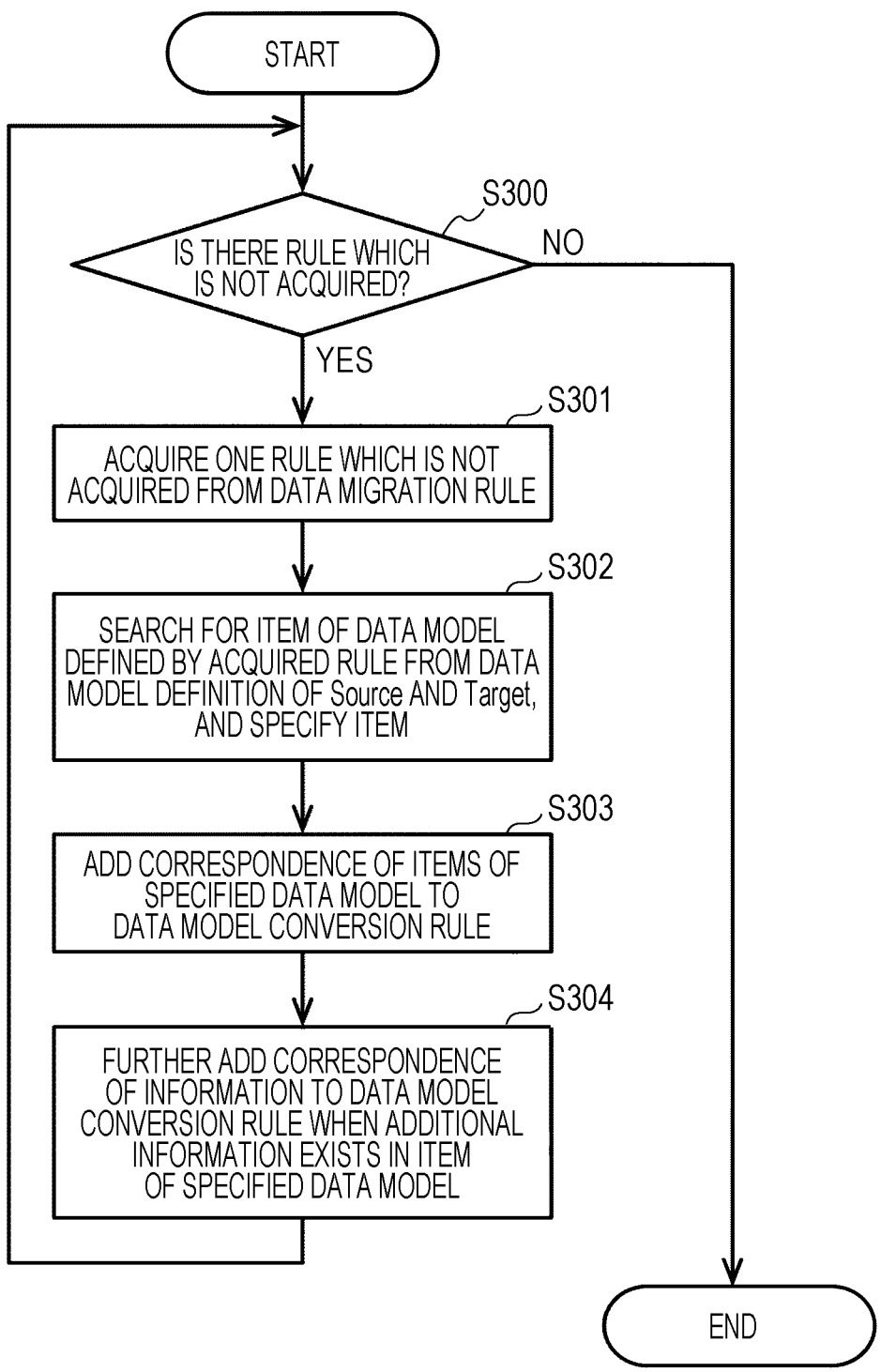
FIG. 11 is a flowchart illustrating details of a data model conversion rule generation processing.

The details of the data model conversion rule DMCR will be described later with reference to FIG. 11.

Next, the data migration system 1 stores the generated data model conversion rule DMCR in the data model conversion rule storage section 42 (S105).

Figure 10:
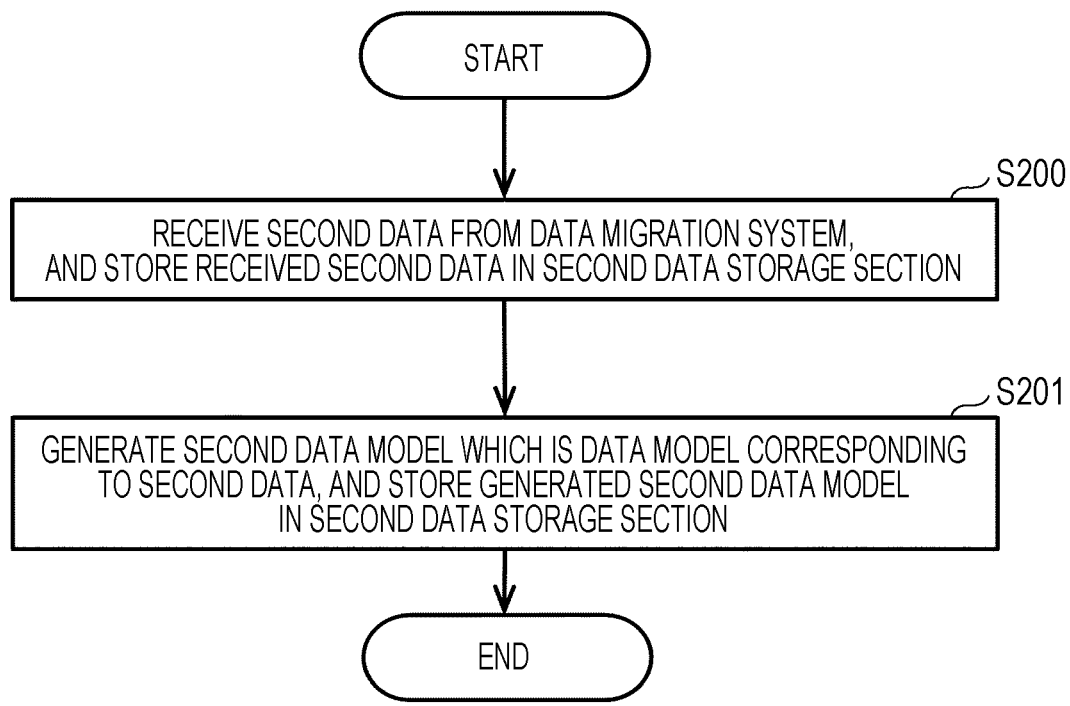
FIG. 10 is a flowchart illustrating processing in which a second data store management system receives a second data.

Next, the details of the processing in which the second data store management system receives the second data will be described with reference to FIG. 10.

First, the second data store management system 200 receives the second data T2 from the data migration system 1, and stores the received second data T2 in the second data storage section 210 (S200, and A02).

Next, the second data store management system 200 generates a second data model T2DM corresponding to the second data T2 (S02), and stores the generated second data model T2DM in the second data storage section 210 (S201).

Next, the details of the data model conversion rule generation processing will be described with reference to FIGS. 8, 11, and 12.

Figure 9:
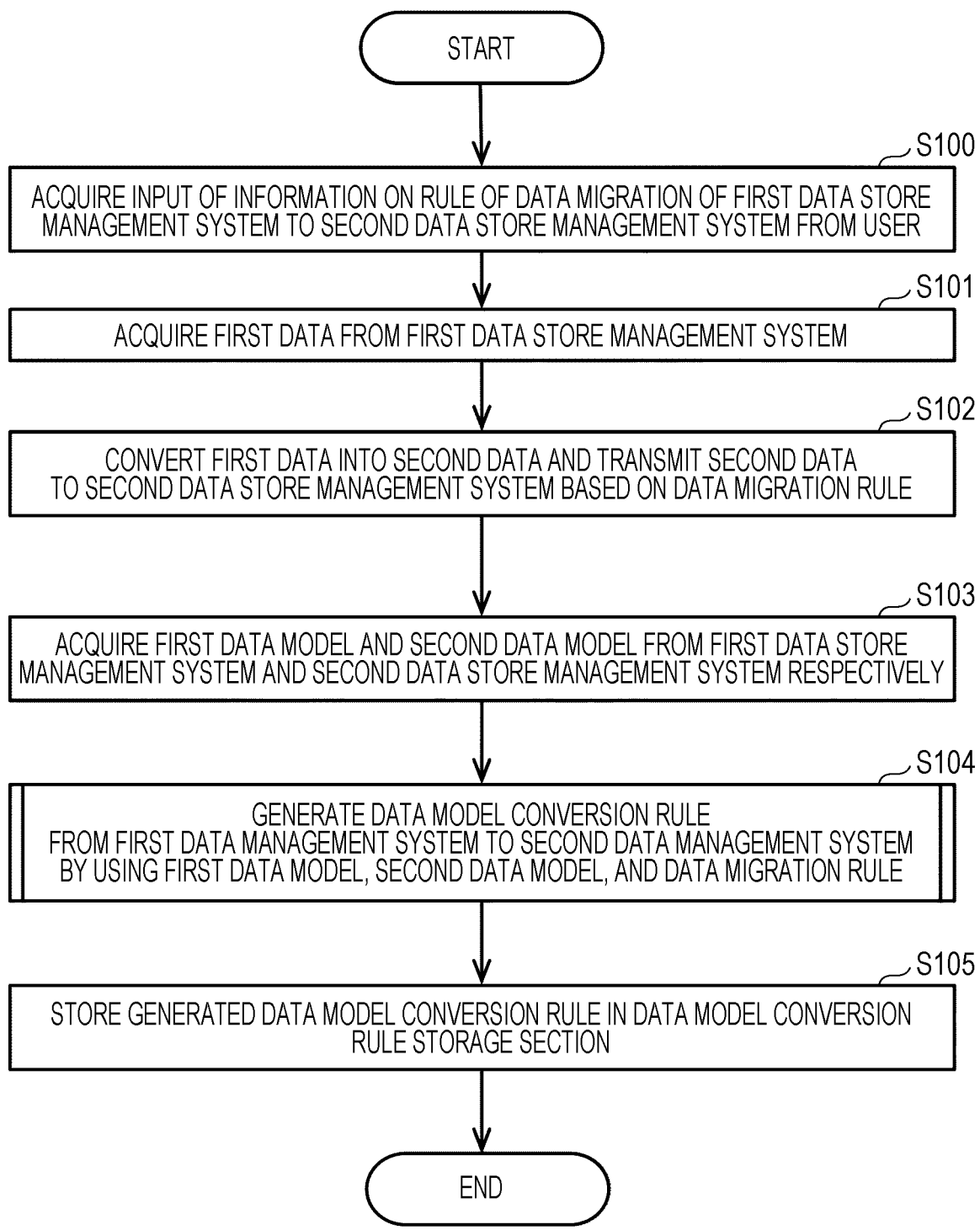
FIG. 9 is a flowchart illustrating processing until a data model conversion rule is generated by a data migration system.

The data model conversion rule generation processing is processing corresponding to S104 in FIG. 9.

First, the data migration system 1 determines whether or not there is a rule which is not acquired from the data migration rule DTMR illustrated shown in FIG. 8 (S300).

In the data migration rule DTMR illustrated in FIG. 8, since rules 1 to 3 are stipulated, these rules are acquired and then the rules are applied from the rules which is not acquired in order.

When there is a rule which is not acquired (S300: Yes), the processing proceeds to S301, and when there is not a rule which is not acquired (S300: No), the processing ends.

When there is a rule which is not acquired, the rule which is not acquired is acquired from the data migration rule DTMR (S301).

Next, an item of the data model defined by the acquired rule is searched for from the data model of Source and Target, and the item is specified (S302).

For example, an item of Column.ID of the rule 2 corresponds to Column named ID of the RDB table T1, and an item of Field.ID corresponds to Field named ID of the document type database collection T2.

Next, a correspondence of the items of the specified data model is added to the data model conversion rule DMCR (S303).

Next, when additional information exists in the item of the specified data model, a correspondence of the information is added to the data model conversion rule DMCR (S304).

Figure 12:
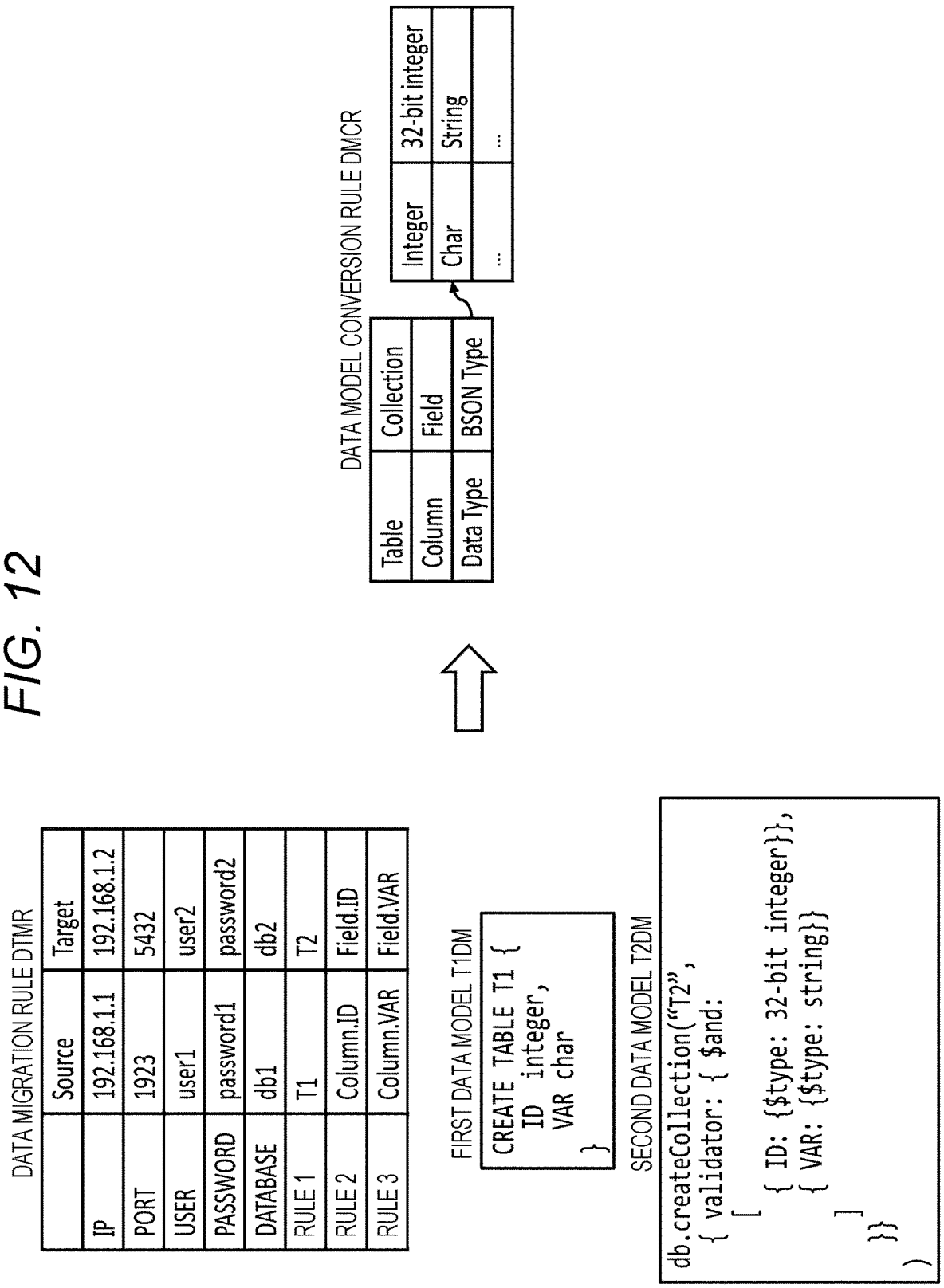
FIG. 12 is a diagram illustrating processing of generating a data model conversion rule.

The generated data model conversion rule DMCR is as illustrated in FIG. 12.

That is, in the first row of the data model conversion rule DMCR, RDB table corresponds to the document type database collection, in the second row, Column of the RDB corresponds to Field of the document type database, and in the third row, Data Type of the RDB corresponds to Binary JavaScript Object Notation (BSON) Type of the document type database. As the detailed information in the third row, a correspondence of each data type is shown.

As described above, the data model conversion rule DMCR of the embodiment includes a conversion rule corresponding to concepts of a database, a table, and a column of the RDB, but the data model conversion rule DMCR may include other concepts corresponding to a primary key, a foreign key, and an index.

Figure 13:
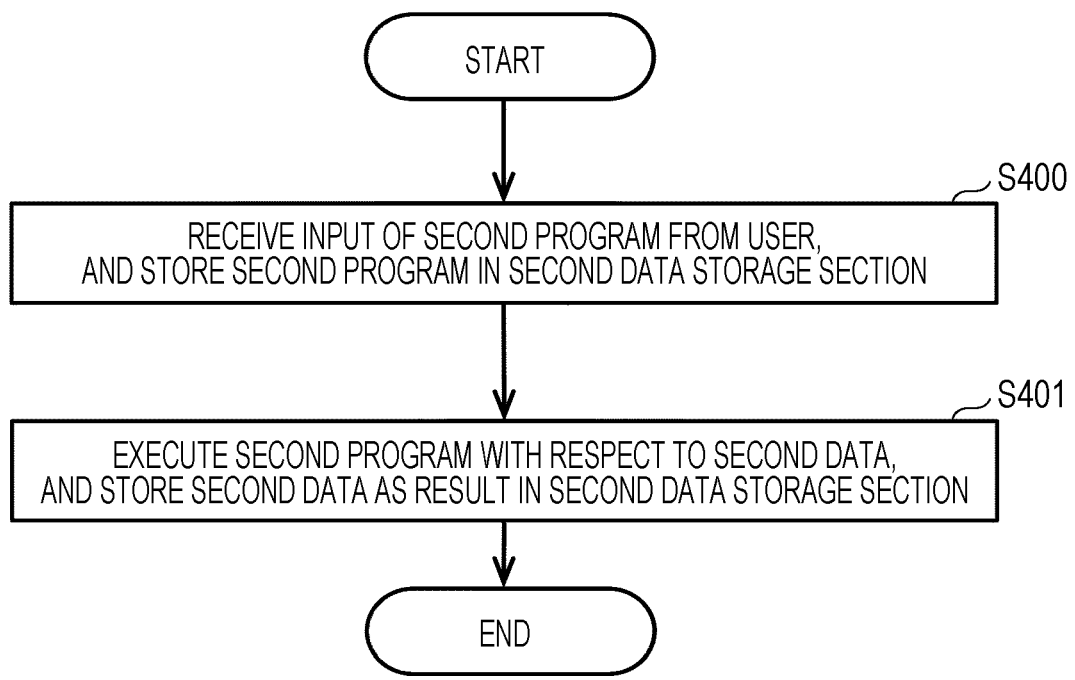
FIG. 13 is a diagram illustrating processing in which a second data store management system executes a second program.

Next, the processing in which the second data store management system executes the second program will be described with reference to FIG. 13.

First, the second data store management system 200 causes the user to input the second program P2, and stores the second program P2 in the second data storage section 210 (S400, and A05).

Next, the second data store management system 200 executes the second program P2 with respect to the second data T2 (S04), and stores the second data T2' as the result in the second data storage section 210 (S401, and FIG. 5).

Next, the processing in which the data migration system converts the second program into the first program will be described with reference to FIG. 14.

First, the data migration system 1 acquires the second program P2 from the second data store management system 200 (S500, and A07).

Next, the data migration system 1 acquires the data model conversion rule DMCR generated at the time of performing the second data migration processing on the second data program from the data model conversion rule storage section 42 (S501).

Next, the data migration system 1 converts the second program P2 into the first program P1 corresponding to the first data T1 by using the acquired data model conversion rule DMCR (S502, and S05).

Figure 15:
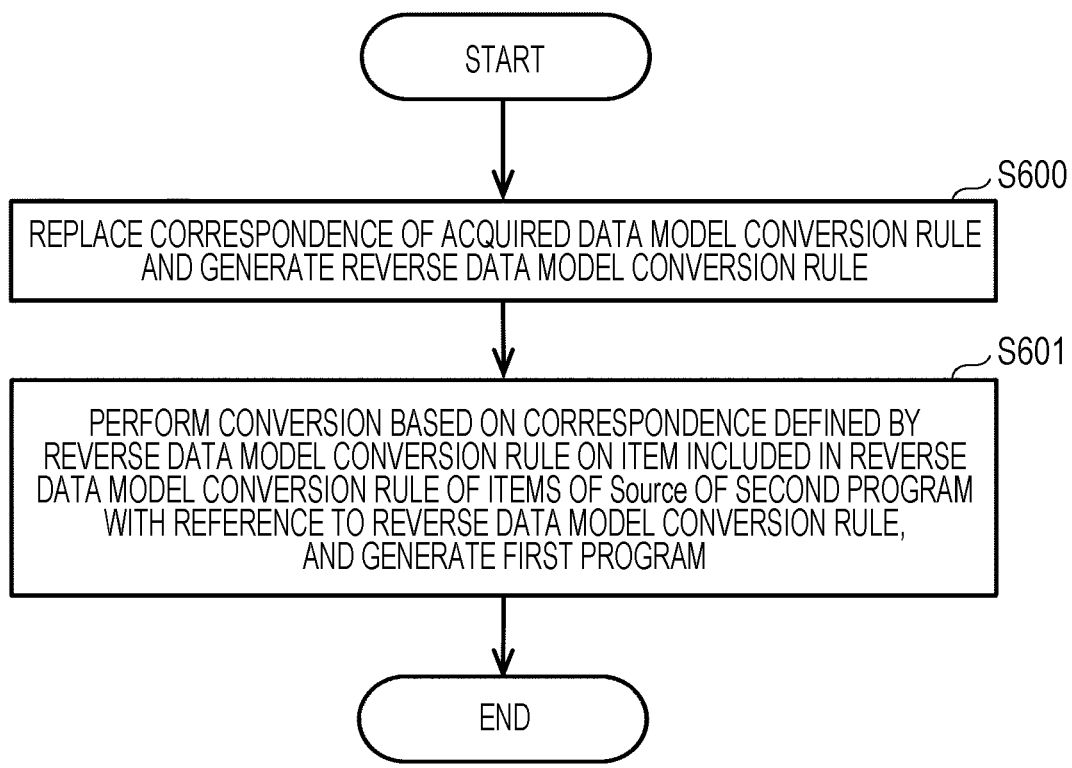
FIG. 15 is a flowchart illustrating details of processing of converting a second program into a first program.

The details of the processing of converting the second program P2 into the first program P1 will be described later with reference to FIG. 15.

Next, the data migration system 1 transmits the converted first program P1 to the first data store management system 100 (S503, and A08).

Next, the details of the processing in which the data migration system 1 converts the second program into the first program will be described with reference to FIGS. 15 and 16.

Figure 14:
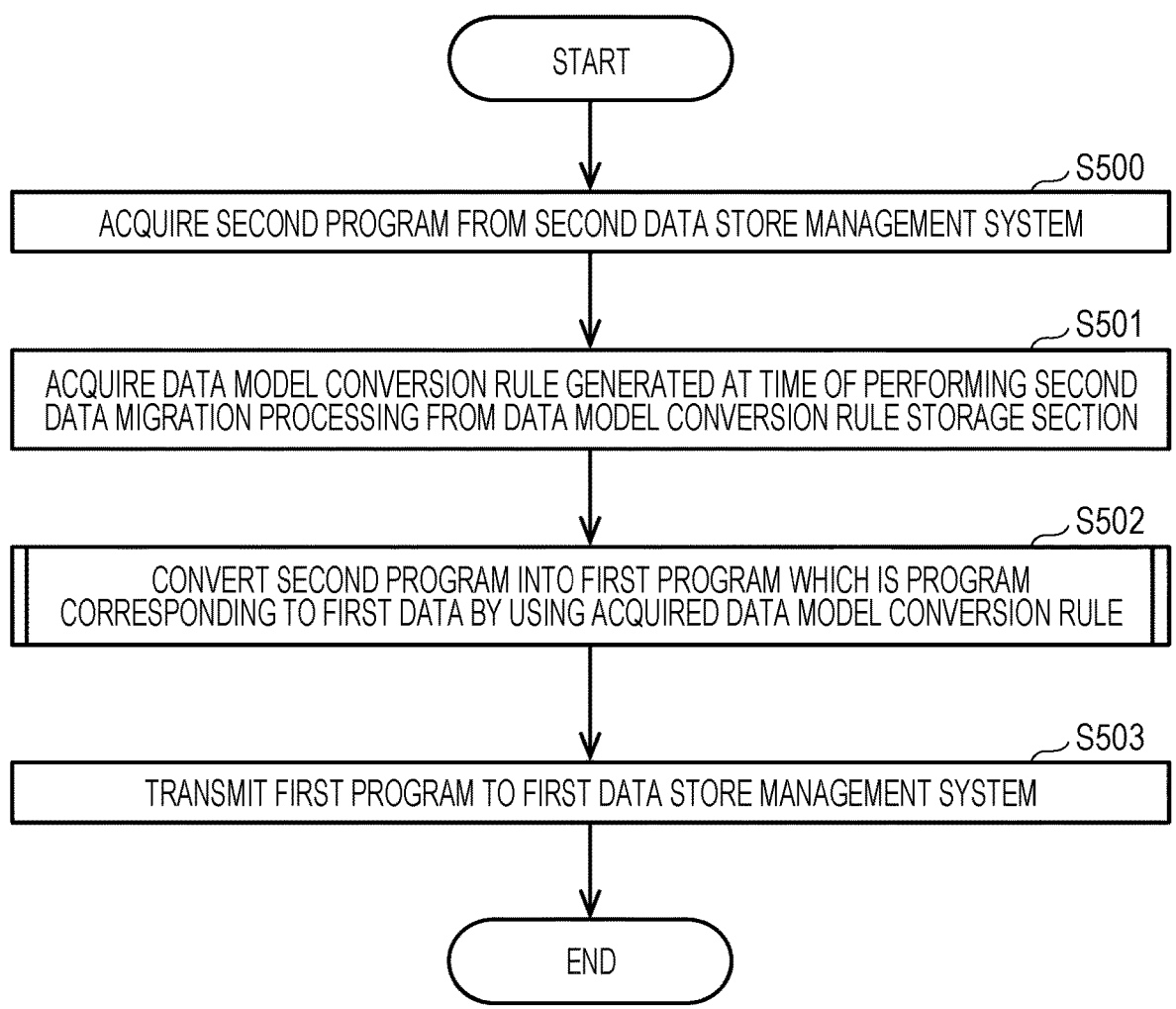
FIG. 14 is a diagram illustrating processing in which a data migration system converts a second program into a first program.

The processing is processing corresponding to S502 in FIG. 14.

The data migration system 1 replaces the correspondence of the acquired data model conversion rule DMCR and generates a reverse data model conversion rule RDMCR (S600).

Figure 16:
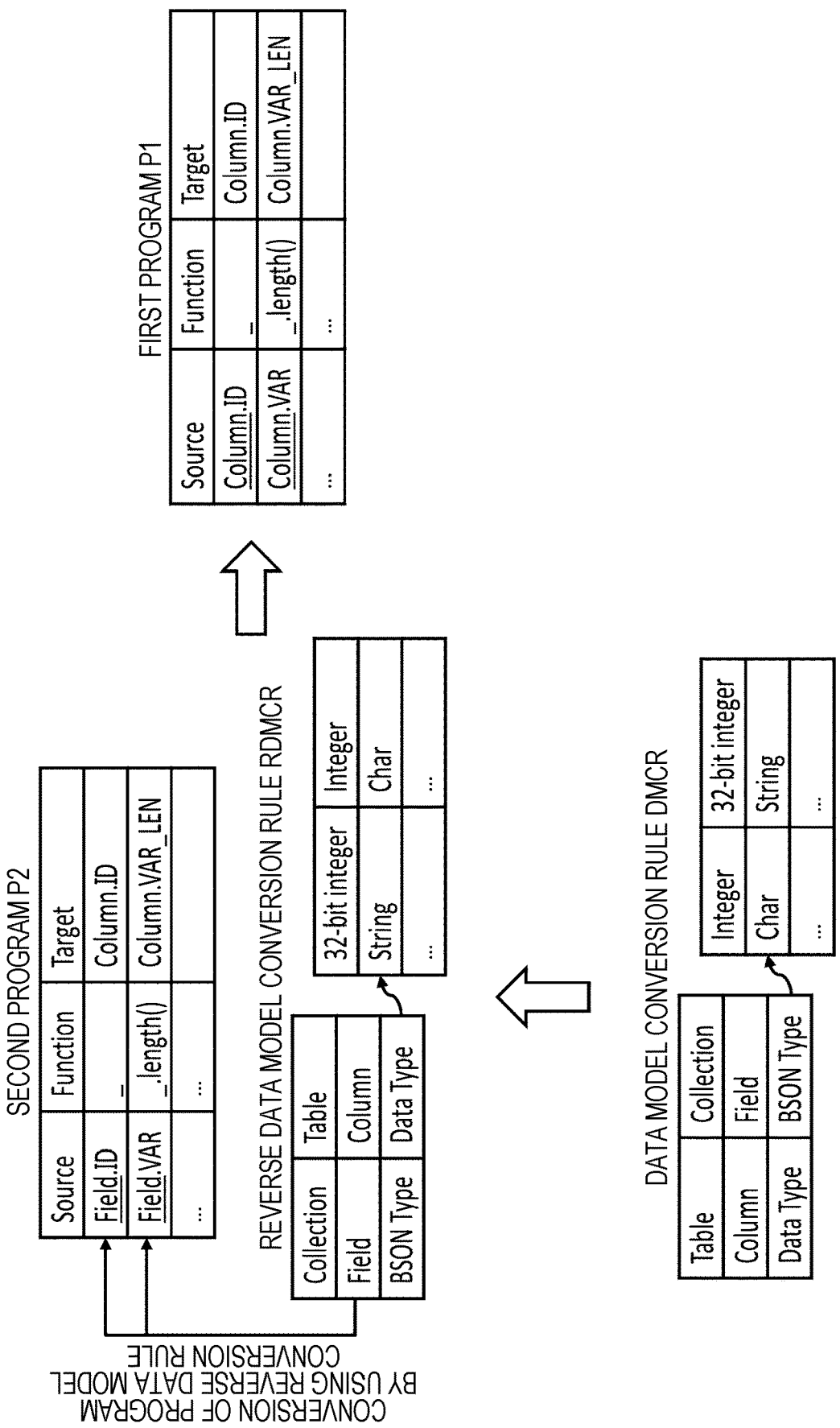
FIG. 16 is a diagram illustrating details of program conversion processing.

In the example illustrated in FIG. 16, in the data model conversion rule DMCR, "Table, Column, and Data Type" in a Source column and "Collection, Field, and BSON Type" in a Target column are replaced to be "Collection, Field, and BSON Type" in the Source column, and "Table, Column, and Data Type" in the Target column in the reverse data model conversion rule RDMCR.

Next, with reference to the reverse data model conversion rule RDMCR, the conversion based on the correspondence defined by the reverse data model conversion rule RDMCR is performed on the item included in the reverse data model conversion rule RDMCR of the items of the second program P2, and the first program P1 is generated (S601).

In the example illustrated in FIG. 16, in the reverse data model conversion rule RDMCR, for example, since the Source column is "Field" and the Target column is "Column" in the second row, the second row of the Source column in the first program P1 is set to be "Column.ID" by corresponding to "Field.ID" of the second row of the Source column in the second program P2, and the second row of the Source column in the first program P1 is set to be "Column.VAR" by corresponding to "Field.VAR" of the second row of the Source column in the second program P2.

As described above, according to the embodiment, even when the data model is different between the development environment of the program and the production environment in which the program is operated, the data model conversion rule is generated, and the program developed in the development environment is automatically converted into the program operated in the production environment based on the data model conversion rule. Therefore, man-hours of the program migration can be reduced, and the migration can be performed promptly.

Embodiment 2

Hereinafter, Embodiment 2 according to the present invention will be described with reference to FIGS. 17 and 18.

In Embodiment 1, the correspondence between the data store management system of a data migration source and the data store management system of a data migration destination has one to one relationship. However, the correspondence between the data store management system of the data migration source and the data store management system of the data migration destination may have N to one, one to N, or N to N relationship. The correspondence of the data model conversion rules may have N to one, one to N, or N to N relationship depending on the correspondence of the data store management systems.

Hereinafter, in the embodiment, a case where the correspondence between the data store management system of the data migration source and the data store management system of the data migration destination has two to one relationship is exemplified, and a part different from Embodiment 1 will be mainly described.

Figure 17:
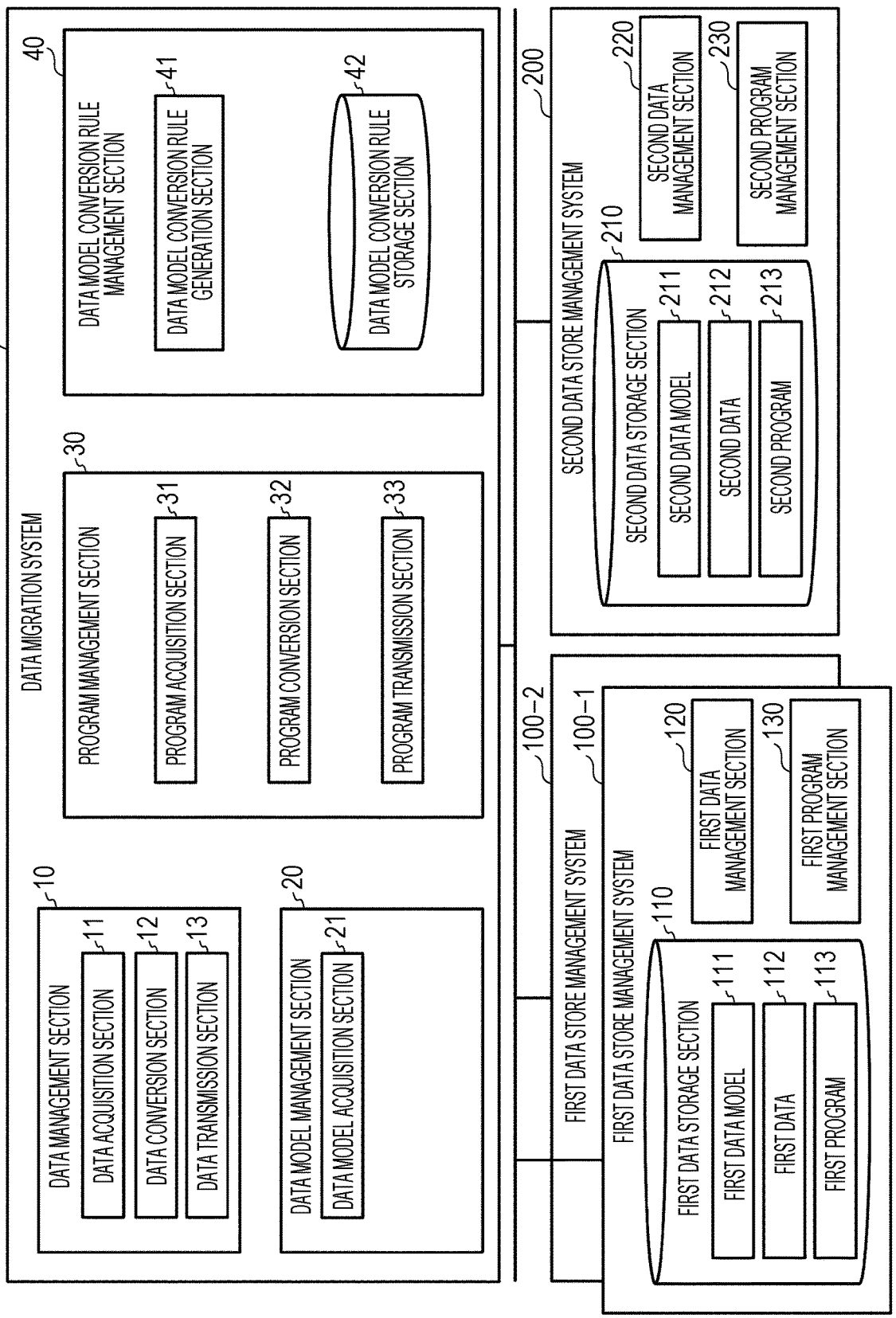
FIG. 17 is a diagram illustrating a configuration of an information processing system in which a data migration system is used according to Embodiment 2.

An information processing system illustrated in Embodiment 2 is configured of a first data store management system 100-1, a first data store management system 100-2, and a second data store management system 200, and a data migration system 1 that supports a data migration among the first data store management system 100-1, the first data store management system 100-2, and the second data store management system 200, and a migration of a program related to the data migration as illustrated in FIG. 17.

Embodiment 2 is the same as Embodiment 1 except that there are two data store management systems of the data migration source.

Here, the first data store management systems 100-1 and 100-2 are systems in a production environment, and the second data store management system 200 is a system in a PoC environment.

In the embodiment, as illustrated in FIG. 18, a first data model T1-1DM in the first data store management system 100-1 and a first data model T1-2DM in the first data store management system 100-2 are stipulated, and a second data model T2DM in the second data store management system 200 is stipulated. That is, the first data store management system 100-1, and the first data store management system 100-2 are RDB database systems, and the second data store management system 200 is a document type database system.

In a data migration rule DTMR, as illustrated in FIG. 18, a Source 1 column, and a Source 2 column are defined by corresponding to the first data store management system 100-1 and the first data store management system 100-2 respectively, and a Target column is defined by corresponding to the second data store management system 200.

At this time, in the data model conversion rule DMCR, it is stipulated that the conversion into Collection of the second data store management system 200 is performed with correspondence to TABLE T1-1 or TABLE T1-2, which is data of each of the first data store management system 100-1 and the first data store management system 100-2 in the same way.

The processing of converting the program using this is the same as in Embodiment 1.

As described above, according to the embodiment, even when the correspondence between the data store management system of the data migration source and the data store management system of the data migration destination has N to one, one to N, or N to N relationship, the program in the development environment can be converted into the program in the production environment without spending man-hours.

What is claimed is:

1. A data migration system comprising:
a processor;
at least one non-transitory computer readable storage medium comprising a plurality of instructions that when executed by the processor, are configured to perform a data migration of a first information system to a second information system, wherein
the first information system uses a first data model;
the second information system uses a second data model;
wherein the plurality of instructions further comprises:
a first software using the first data model used in the first information system is converted into a second software using the second data model by using a data migration rule, and a data model conversion rule that converts the first data model into the second data model is created; and
a third software, which is created by the second information system based on the second software and uses the second data model, is converted into a fourth software using the first data model based on the data model conversion rule,
wherein a reverse data model conversion rule is created, the reverse data model conversion rule obtained by reversing a correspondence of data models of Source and Target of the data model conversion rule, and
the third software is converted into the fourth software by using the reverse data model conversion rule.

2. The data migration system according to claim 1, wherein the data migration rule stipulates a correspondence of Source and Target with respect to each of data model items; and
the data model conversion rule is created by acquiring items corresponding to Source of the data migration rule from the first data model and items corresponding to Target of the data migration rule from the first data model, and then causing the items to correspond to another.

3. The data migration system according to claim 1, wherein the first software and the second software are databases, and the third software and the fourth software are programs.

4. The data migration system according to claim 1, wherein any one of the first data model and the second data model is a data model of a relational database (RDB).

5. The data migration system according to claim 1, wherein any one of the first data model and the second data model is a data model of any one of a document type database, a key value, and a file system.

6. The data migration system according to claim 3, wherein the data model conversion rule includes rules for a database, Table, and Column of an RDB.

7. The data migration system according to claim 3, wherein the data model conversion rule includes rules for a primary key, a foreign key, and an index.

8. The data migration system according to claim 1, wherein a screen for inputting the data migration rule is displayed.

9. A data migration method that performs a data migration of a first information system to a second information system, wherein
the first information system uses a first data model;
the second information system uses a second data model;
the method comprises converting a first software using the first data model used in the first information system into a second software using the second data model by using a data migration rule, and creating a data model conversion rule that converts the first data model into the second data model;
creating a reverse data model conversion rule, the reverse data model conversion rule obtained by reversing a correspondence of data models of Source and Target of the data model conversion rule; and
converting a third software, which is created by the second information system based on the second software and uses the second data model, into a fourth software using the first data model based on the data model conversion rule and by using the reverse data model conversion rule.

* * * * *